United States Patent
Nagata et al.

(10) Patent No.: US 6,544,593 B1
(45) Date of Patent: Apr. 8, 2003

(54) HIGH SOLIDS CLEAR COATING COMPOSITION

(75) Inventors: Isao Nagata, Troy, MI (US); Peter William Uhlianuk, Romeo, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/913,570

(22) PCT Filed: Mar. 16, 2000

(86) PCT No.: PCT/US00/06962

§ 371 (c)(1),
(2), (4) Date: Nov. 6, 2001

(87) PCT Pub. No.: WO00/55263

PCT Pub. Date: Sep. 21, 2000

Related U.S. Application Data

(60) Provisional application No. 60/124,850, filed on Mar. 17, 1999, and provisional application No. 60/171,556, filed on Dec. 22, 1999.

(51) Int. Cl.$^7$ ............................. B05D 3/02; C08G 18/24; C08G 18/80
(52) U.S. Cl. ........................ 427/385.5; 528/45; 528/60
(58) Field of Search .................... 427/385.5; 528/45, 528/60

(56) References Cited

U.S. PATENT DOCUMENTS

| | | |
|---|---|---|
| 3,928,299 A | 12/1975 | Rosenkranz et al. |
| 3,954,900 A | 5/1976 | Schmalz et al. |
| 4,064,110 A | 12/1977 | Arlt et al. |
| 4,315,091 A | 2/1982 | Steinberger et al. |
| 4,403,086 A | 9/1983 | Holubka et al. |
| 4,440,937 A * | 4/1984 | Krimm et al. ............ 549/228 |
| 4,499,150 A | 2/1985 | Dowbenko et al. |
| 4,533,716 A | 8/1985 | Okoshi et al. |
| 4,632,964 A | 12/1986 | Altschuler et al. |
| 4,760,108 A | 7/1988 | Asano et al. |
| 4,820,830 A | 4/1989 | Blank |
| 4,849,480 A | 7/1989 | Antonelli et al. |
| 4,960,828 A | 10/1990 | Higuchi et al. |
| 5,010,140 A | 4/1991 | Antonelli et al. |
| 5,051,473 A | 9/1991 | Tabuchi et al. |
| 5,059,670 A | 10/1991 | Harris |
| 5,169,719 A | 12/1992 | Balatan |
| 5,182,174 A | 1/1993 | Stephenson |
| 5,230,962 A | 7/1993 | Stephenson |
| 5,279,862 A | 1/1994 | Corcoran et al. |
| 5,281,443 A | 1/1994 | Briggs et al. |
| 5,336,566 A | 8/1994 | Rehfuss |
| 5,356,669 A | 10/1994 | Rehfuss |
| 5,373,069 A | 12/1994 | Rehfuss et al. |
| 5,446,110 A | 8/1995 | Rehfuss et al. |
| 5,510,443 A * | 4/1996 | Shaffer et al. .............. 528/45 |
| 5,512,639 A | 4/1996 | Rehfuss et al. |
| 5,646,213 A | 7/1997 | Guo |
| 5,665,433 A | 9/1997 | Moussa et al. |
| 5,684,084 A | 11/1997 | Lewin et al. |
| 5,719,237 A | 2/1998 | Rehfuss et al. |
| 5,726,246 A | 3/1998 | Rehfuss et al. |
| 5,744,550 A | 4/1998 | Menovcik et al. |
| 5,747,590 A | 5/1998 | Corcoran et al. |
| 5,760,127 A | 6/1998 | Bammel et al. |
| 5,763,528 A | 6/1998 | Barsotti et al. |
| 5,837,795 A | 11/1998 | Lomoelder et al. |
| 5,853,809 A | 12/1998 | Campbell et al. |
| 5,872,195 A | 2/1999 | Green et al. |
| 5,886,125 A | 3/1999 | Huybrechts |
| 5,891,981 A | 4/1999 | Mauer et al. |
| 5,965,272 A | 10/1999 | Donnelly et al. |
| 6,013,326 A | 1/2000 | Flosbach et al. |
| 6,143,367 A | 11/2000 | Bartol et al. |
| 6,221,494 B1 | 4/2001 | Barsotti et al. |

FOREIGN PATENT DOCUMENTS

| | | | |
|---|---|---|---|
| DE | 4124688 | * | 1/1993 |
| DE | 19529124 | | 11/1996 |
| EP | 0017187 A1 | | 10/1980 |
| EP | 0135741 B1 | | 4/1985 |
| EP | 0179281 A1 | | 4/1986 |
| EP | 0257848 A2 | | 3/1988 |
| EP | 272664 | * | 6/1988 |
| EP | 0562577 | | 9/1993 |
| EP | 708159 | * | 4/1996 |
| FR | 2265828 A | | 10/1975 |
| FR | 2392090 | | 12/1978 |
| JP | 05271608 A | | 10/1993 |
| JP | 06256714 | | 9/1994 |
| JP | 07233348 | | 9/1995 |
| JP | 10045867 | | 2/1998 |
| WO | WO 9625466 A1 | | 8/1996 |
| WO | WO 9634905 A | | 11/1996 |
| WO | WO 9722647 A1 | | 6/1997 |
| WO | WO 9827134 A1 | | 6/1998 |
| WO | WO 9919411 A | | 4/1999 |

OTHER PUBLICATIONS

Copy of International Search Report dated Jul. 31, 2000, for WO 2000/55263, Sep. 2000.

Yasushi Nakate, Sep. 6, 1978, High–Solid Urethane Coating Compositions, JP53 102332 Translation, XP–002143021, 6001 Chemical Abstract vol. 90 (1979) No. 2, pp. 78).

Chapter 3, pp. 48–61, Uses and Abuses of Photon Correlation Spectroscopy in Particle Sizing by Weiner et al. 1987 edition of American Chemical Society Symposium series.

NTSIHLELE et al, 1995, Journal of Applied Polymer Science, Cross–Linked Coatings by Co–Reaction of Isocyanate–Methoxymethyl Melamine System, vol. 55, No. 2, pp. 153–161.

* cited by examiner

*Primary Examiner*—Erma Cameron
(74) *Attorney, Agent, or Firm*—Sudhir G. Deshmukh

(57) ABSTRACT

The present invention provides for an etch and mar resistant low VOC clear coating composition most suitable for use as a top clear coat in multi-layered OEM or refinish automotive coatings. The coating composition includes isocyanate, carbonate and melamine components. The isocyanate component includes an aliphatic polyisocyanate. The composition may be formulated as a two-pack or one-pack coating composition, wherein the isocyanate functionalities are blocked with a blocker such as a mono-alcohol.

26 Claims, No Drawings

HIGH SOLIDS CLEAR COATING COMPOSITION

CROSS-REFERENCE TO PARENT APPLICATIONS

This application is a 35 U.S.C. §371 of PCT/US00/06962 filed on Mar. 16, 2000, which claims benefit of provisional Application Ser. No. 60/124,850, filed Mar. 17, 1999 and No. 60/171,556, filed Dec. 22, 1999.

The present invention generally relates to high solids, low VOC (volatile organic component) coating compositions and more particularly to low VOC clear coating compositions suited for multi-layered coatings used in automotive OEM and refinish applications.

Basecoat-clearcoat systems have found wide acceptance in the automotive finishes market. Continuing effort has been directed to improve the overall appearance, the clarity of the topcoat, and the resistance to deterioration of these coating systems at ever-higher application solids levels. Further effort has also been directed to the development of coating compositions having low VOC. A continuing need still exists for clear coating formulations having an outstanding balance of performance characteristics after application, particularly gloss and distinctness of image (DOI) at high solids levels. Melamine/acrylic polyol crosslinked or melamine self-condensed coatings for example, may provide coatings having acceptable mar but such coatings have poor acid etch resistance and decreased appearance at higher solids levels. On the other hand, isocyanate/acrylic polyol based 2K urethane coatings generally provide acceptable acid-etch resistance but such coatings have poor mar resistance. Therefore, a need still exists for coatings that not only provide acceptable mar and acid-etch resistance but also high gloss and DOI at the lowest VOC possible.

One approach described by Ntsihlele and Pizzi in an article titled "Cross-Linked Coatings by Co-Reaction of Isocyanate-Methoxymethyl Melamine Systems" (Journal of Applied Polymer Science, Volume 55, Pages 153–161—1995) provides for reacting aromatic diisocyanate with methoxymethyl melamine. However, a need still exists for a high solids clear coating composition, which upon a long-term exposure to sunlight does not yellow or become brittle and provides high gloss and DOI.

STATEMENT OF THE INVENTION

The present invention is directed to a clear coating composition comprising isocyanate, cyclic carbonate and melamine components wherein said isocyanate component comprises an aliphatic polyisocyanate having on an average 2 to 6 isocyanate functionalities.

The present invention is also directed to a method of producing a clear coating on a substrate comprising:

applying a layer of a clear coating composition comprising isocyanate, cyclic carbonate and melamine components wherein said isocyanate component comprises an aliphatic polyisocyanate having on an average 2 to 6 isocyanate functionalities; and curing said layer into said clear coating.

One of the advantages of the present invention is its low VOC, which is significantly below the current guidelines of Environment Protection Agency (EPA) of the United States.

Another advantage is the mar and etch resistance and hardness of the coating resulting from the coating composition of the present invention.

Yet another advantage is the clarity and high gloss of the coating resulting from the coating composition of the present invention.

As used herein:

"Two-pack coating composition" means a thermoset coating composition comprising two components stored in separate containers. These containers are typically sealed to increase the shelf life of the components of the coating composition. The components are mixed prior to use to form a pot mix. The pot mix has a limited pot life typically of minutes (15 minutes to 45 minutes) to a few hours (4 hours to 6 hours). The pot mix is applied as a layer of desired thickness on a substrate surface, such as an autobody. After application, the layer is cured under ambient conditions or cure-baked at elevated temperatures to form a coating on the substrate surface having desired coating properties, such as high gloss, mar-resistance and resistance to environmental etching.

"One-pack coating composition" means a thermoset coating composition comprising two components that are stored in the same container. However, the one component is blocked to prevent premature crosslinking. After the application of the one-pack coating composition on a substrate, the layer is exposed to elevated temperatures to unmask the blocked component. Thereafter, the layer is bake-cured at elevated temperatures to form a coating on the substrate surface having desired coating properties, such as high gloss, mar-resistance and resistance to environmental etching.

"Low VOC coating composition" means a coating composition that includes in the range of from 0 to 0.472 kilogram of organic solvent per liter (4 pounds per gallon), preferable in the range of from 0.118 (1 pound per gallon) to 0.178 kilogram of organic solvent per liter (1.5 pounds per gallon) of the composition, as determined under the procedure provided in ASTM D3960.

"High solids composition" means a coating composition having a solid component in the range of from 65 to 100 percent and preferably greater than 70 percent, all in weight percentages based on the total weight of the composition.

"Clear coating composition" means a clear coating composition that produces upon cure, a clear coating having DOI (distinctness of image) rating of more than 80 and 20° gloss rating of more than 80.

"GPC weight average molecular weight" and "GPC number average molecular weight" means a weight average molecular weight and a weight average molecular weight, respectively measured by utilizing gel permeation chromatography. A high performance liquid chromatograph (HPLC) supplied by Hewlett-Packard; Palo Alto, Calif. was used. Unless stated otherwise, the liquid phase used was tetrahydrofuran and the standard was polymethyl methacrylate.

"Polymer particle size" means the diameter of the polymer particles measured by using a Brookhaven Model BI-90 Particle Sizer supplied by Brookhaven Instruments Corporation, Holtsville, N.Y. The sizer employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. 1987 edition of American Chemical Society Symposium series.

"Polymer solids" or "composition solids" means a polymer or composition in its dry state.

"Aliphatic" as employed herein includes aliphatic and cycloaliphatic materials.

"Crosslinkable" means that the individual components of an adduct contain functionalities which react within the composition of the invention to give a coating of good appearance, durability, hardness and mar resistance.

"Acid etch resistance" refers to the resistance provided by a coated surface against chemical etching action by the environment, such for example acid rain.

"Mar resistance" refers to the resistance provided by coating to mechanical abrasions, such as, for example, the abrasion of a coated surface, such as an automotive body, that typically occurs during washing and cleaning of the coated surface.

Applicants have unexpectedly discovered that contrary to conventional approaches used in typical thermoset coating compositions, i.e., those involving polymers and crosslinking components, a very viable route lies in a combination of what would traditionally be considered as crosslinking agents for producing a unique low VOC high solids clear coating composition that produces coatings having superior coating properties, such as clarity, and mar and etch resistance. Applicants have further unexpectedly discovered that by including a cyclic carbonate component in a clear coating composition, the solids level can be further increased without sacrificing the etch and mar resistance, gloss, DOI, and other desired coating properties. It is believed that the carbonate component acts as a substitute for a solvent typically used in a coating composition and reacts upon cure to generate a stable and durable crosslinking structure. Thus, the viscosity of the resulting coating composition can be substantially lowered without sacrificing coating properties.

The clear coating composition includes isocyanate, cyclic carbonate and melamine components. The isocyanate component includes an aliphatic polyisocyanate having on an average 2 to 6, preferably 2.5 to 6 and more preferably 3 to 4 isocyanate functionalities. The coating composition includes in the range of from 30 percent to 70 percent, preferably in the range of from 35 percent to 55 percent, and most preferably in the range of 40 percent to 50 percent of the aliphatic polyisocyanate, the percentages being in weight percentages based on the total weight of composition solids.

Examples of suitable aliphatic polyisocyanates include aliphatic or cycloaliphatic di-, tri- or tetra-isocyanates, which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane 4,4'-diisocyanate, meta-tetramethylxylylene diisocyanate, polyisocyanates having isocyanurate structural units such as the isocyanurate of hexamethylene diisocyanate and isocyanurate of isophorone diisocyanate, the adduct of 2 molecules of a diisocyanate, such as hexamethylene diisocyanate, uretidiones of hexamethylene diisocyanate, uretidiones of isophorone diisocyanate or isophorone diisocyanate, and a diol such as ethylene glycol, the adduct of 3 molecules of hexamethylene diisocyanate and 1 molecule of water (available under the trademark Desmodur N of Bayer Corporation, Pittsburgh, Pa.).

Aromatic polyisocyanates are not suitable for use in the present invention as the clear coatings resulting therefrom are too light sensitive and tend to yellow with age and crack upon long term exposure to sunlight. As a result such clear coatings are not durable.

If desired, the isocyanate functionalities of the polymeric isocyanate may be capped with a monomeric alcohol to prevent premature crosslinking in a one-pack composition. Some suitable monomeric alcohols include methanol, ethanol, propanol, butanol, isopropanol, isobutanol, hexanol, 2-ethylhexanol and cyclohexanol.

The melamine component of the coating composition includes suitable monomeric or polymeric melamines or a combination thereof. Alkoxy monomeric melamines are preferred. The coating composition includes in the range of from 10 percent to 45 percent, preferably in the range of from 20 percent to 40 percent, and most preferably in the range of from of 25 percent to 35 percent of the melamine, the percentages being in weight percentages based on the total weight of composition solids.

In the context of the present invention, the term "alkoxy monomeric melamine" means a low molecular weight melamine which contains, on an average three or more methylol groups etherized with a $C_{1\ to\ 5}$ monohydric alcohol such as methanol, n-butanol, isobutanol or the like per triazine nucleus, and has an average degree of condensation up to about 2 and preferably in the range of about 1.1 to about 1.8, and has a proportion of mononuclear species not less than about 50 percent by weight. The polymeric melamines have an average degree of condensation of more than 1.9

Some of such suitable monomeric melamines include highly alkylated melamines, such as methylated, butylated, isobutylated melamines and mixtures thereof. More particularly hexamethylol melamine, trimethylol melamine, partially methylated hexamethylol melamine, and pentamethoxymethyl melamine are preferred. Hexamethylol melamine and partially methylated hexamethylol melamine are more preferred and hexamethylol melamine is most preferred.

Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327 and 370, which are all monomeric melamines. Suitable polymeric melamines include high amino (partially alkylated, —N, —H) melamine known as Resimene™ BMP5503 (molecular weight 690, polydispersity of 1.98, 56% buytl, 44% amino), which is supplied by Solutia Inc., St. Louis, Mo., or Cymel® 1158 provided by Cytec Industries Inc., West Patterson, N.J.

Cytec Industries Inc. also supplies Cymel® 1130 @ 80 percent solids degree of polymerization of 2.5), Cymel® 1133 (48% methyl, 4% methylol and 8% butyl), both of which are polymeric melamines.

The coating composition preferably includes one or more catalysts to enhance crosslinking of the components on curing. Generally, the coating composition includes in the range of from 0.1 percent to 5 percent, preferably in the range of from 0.1 to 2 percent, more preferably in the range of from 0.5 percent to 2 percent and most preferably in the range of from 0.5 percent to 1.2 percent of the catalyst, the percentages being in weight percentages based on the total weight of composition solids.

Some of the suitable catalysts include the conventional acid catalysts, such as aromatic sulfonic acids, for example dodecylbenzene sulfonic acid, para-toluenesulfonic acid and dinonylnaphthalene sulfonic acid, all of which are either unblocked or blocked with an amine, such as dimethyl oxazolidine and 2-amino-2-methyl-1-propanol, n,n-dimethylethanolamine or a combination thereof. Other acid catalysts that can be used are strong acids, such as phosphoric acids, more particularly phenyl acid phosphate, which may be unblocked or blocked with an amine.

In addition to the foregoing, the coating composition preferably includes a small amount of one or more organo tin catalysts, such as dibutyl tin dilaurate, dibutyl tin diacetate, stannous octate, and dibutyl tin oxide. Dibutyl tin dilaurate is preferred. The amount of organo tin catalyst added generally ranges from 0.001 percent to 0.5 percent, preferably from 0.05 percent to 0.2 percent and more preferably from 0.1 percent to 0.15 percent, the percentages being in weight percentages based on the total weight of composition solids.

These catalysts are preferably added to the melamine component.

The carbonate component of the coating composition includes five membered or six member cyclic carbonates or a combination thereof. Six membered cyclic carbonates are preferred. The coating composition includes in the range of from 5 percent to 40 percent, preferably in the range of from 10 percent to 35 percent, and most preferably in the range of from of 15 percent to 30 percent of the melamine, the percentages being in weight percentages based on the total weight of composition solids.

Some of the suitable cyclic carbonates include cyclic carbonates possessing one or more ring structures per molecule. The cyclic carbonate preferably contains between one to four rings, preferably one ring. Each ring may contain 3 or 4 carbon atoms, with or without pendant side groups. The carbonate component may contain a five-member or a six-member cyclic carbonate, or a combination thereof. Six-member cyclic carbonates are preferred.

Some of the suitable five member cyclic carbonates include those having the formula:

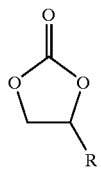

where R=H, $C_1-C_{15}$ alkyl, alkoxy groups, such as methoxyl, ethoxyl, phenoxyl, or a linked polymer structure, such as from polyurethane, polyester or acrylic polymer, all of low number average molecular weight in the range of from 200 to 10,000, preferably in the range of from 300 to 5000 and more preferably in the range of from 400 to 1000.

Five membered cyclic carbonates having 2 or more ring structures may be obtained as the reaction products of glycerin carbonate (R=CH$_2$—OH) with aliphatic diisocyanates or polyisocyanates, such as hexamethylene diisocyanate (HMDI), isophorone diisocyanate, nonane diisocyanate, or their biuret or isocyanurate trimers. Alternatively, a 5 membered cyclic carbonate having 2 or more cyclic carbonate ring structures may be prepared by conventional synthetic routes known within the industry which lead to polyester, polyether, or polyacrylics having such functional sites. Some of the suitable five membered cyclic carbonates include those having on average one ring structure, such as ethylene carbonate, propylene carbonate, butylene carbonate, glycerin carbonate, butyl soyate carbonate, butyl linseed carbonate, or a combination thereof. Ethylene, propylene, and butylene carbonates are preferred.

Some the suitable six member cyclic carbonates include those having the formula:

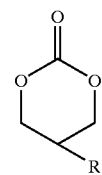

where R=H, $C_1-C_{15}$ alkyl, or alkoxyl group, such as methoxyl, ethoxyl, phenoxyl, or a linked polymer structure, such as from polyurethane, polyester or acrylic polymer, all of low number average molecular weight in the range of from 200 to 10,000, preferably in the range of from 300 to 5000 and more preferably in the range of from 400 to 1000.

Six membered cyclic carbonates having on average one or more ring structure include the reaction products of dialkyl carbonates or phosgene with any 1,3 diol, such as neopentyl glycol, 1,3 propane diol, 2-methyl,-2-propypl-1,3-prolanediol, or trimetholylpropane. Examples of 6 membered ring cyclic carbonates, and their synthesis are described in Examples 1,3 and 9 in U.S. Pat. No. 4,440,937, which is incorporated herein by reference.

The present invention includes six membered cyclic carbonates having on an average one or more cyclic carbonate ring structures which may be conventionally prepared by providing polyester, polyether, gor polyacrylics with carbonate functionalities. Six membered cyclic carbonate functionalized polyurethanes prepared by reacting aliphatic diisocyanates or polyisocyanates with hydroxy functional carbonates, or by reacting multifunctional amines with multi ring containing cyclic carbonates are also suitable for use in the present invention.

The coating composition of the present invention, which is formulated into high solids coating systems further contains at least one organic solvent typically selected from the group consisting of aromatic hydrocarbons, such as petroleum naphtha or xylenes; ketones, such as, methyl amyl ketone, methyl isobutyl ketone, methyl ethyl ketone or acetone; esters, such as, butyl acetate or hexyl acetate; and glycol ether esters, such as propylene glycol monomethyl ether acetate. The amount of organic solvent added depends upon the desired solids level as well as the desired amount of VOC of the composition. If desired, the organic solvent may be added to both components of the binder.

The coating composition of the present invention may also contain conventional additives, such as stabilizers, and rheology control agents, flow agents, and toughening agents. Such additional additives will, of course, depend on the intended use of the coating composition. Any additives that would adversely effect the clarity of the cured coating will not be included as the composition is used as a clear coating. The foregoing additives may be added to either component or both, depending upon the intended use of the coating composition.

The clear coating composition of the present invention may be supplied in the form of a two-pack coating composition in which the first-pack includes the polyisocyanate component and the second-pack includes the melamine component. Generally the first and the second pack are stored in separate containers and mixed before use. The containers are preferably sealed air tight to prevent degradation during storage. The mixing may be done, for example, in a mixing nozzle or in a container.

Alternatively, when the isocyanates functionalities of the polyisocyanate are blocked, both the components of the coating composition can be stored in the same container in the form of a one-pack coating composition.

To improve weatherability of the clear finish of the coating composition, about 0.1 to 5%, by weight, based on the weight of the composition solids, of an ultraviolet light stabilizer or a combination of ultraviolet light stabilizers and absorbers may be added. These stabilizers include ultraviolet light absorbers, screeners, quenchers and specific hindered amine light stabilizers. Also, about 0.1 to 5% by weight, based on the weight of the composition solids, of an antioxidant can be added. Typical ultraviolet light stabilizers that are useful include benzophenones, such as hydroxydodecyclbenzophenone, 2,4-dihydroxybenzophenone; triazoles, such as 2-phenyl-4-(2'-4'-dihydroxybenzoyl) triazoles; and triazines, such as 3,5-dialkyl-4-hydroxyphenyl derivatives of triazine and triazoles such as 2-(benzotriazole-2-yl)-4,6-bis(methylethyl-1-phenyl ethyl)phenol, 2-(3-hydroxy-3,5'-di-tert amyl phenyl) benzotriazole, 2-(3',5'-bis (1,1-dimethylpropyl)-2'-hydroxyphenyl)-2H-benzotriazole, benzenepropanoic acid, 3-(2H-benzotriazol-2-yl)-5-(1,1-dimethylethyl)-4-hydroxy-$C_{7-9}$-branched alkyl esters, and 2-(3',5'-bis(1-methyl-1-phenylethyl)-2'-hydroxyphenyl) benzotriazole.

Typical hindered amine light stabilizers are bis(2,2,6,6-tetramethylpiperidinyl)sebacate, bis(N-methyl-2,2,6,6-tetramethylpiperidinyl)sebacate and bis(N-octyloxy-2,2,6,6-tetramethylpiperidynyl)sebacate. One of the useful blends of ultraviolet light absorbers and hindered amine light stabilizers is bis(N-octyloxy-2,2,6,6-tetramethylpiperidynyl) sebacate and benzenepropanoic acid, 3-(2H-benzotriazol-2-yl)-5-(1,1-dimethylethyl)-4-hydroxy-,C7–9-branched alkyl esters. Another useful blend of ultraviolet light absorbers and hindered amine light stabilizers is 2-(3',5'-bis(1-methyl-1-phenylethyl)-2'-hydroxyphenyl)benzotriazole and decanedioc acid,bis(2,2,6,6,-tetramethyl-4-piperidinyl)ester both supplied by Ciba Specialty Chemicals, Tarrytown, N.Y. under the trademark Tinuvin® 900 and Tinuvin® 123, respectively.

The coating composition of the present invention optionally contains in the range of from 0.1 percent to 40 percent, preferably in the range of from 5 percent to 35 percent, and more preferably in the range of from 10 percent to 30 percent of a flow modifying resin, such as a non-aqueous dispersion (NAD), all percentages being based on the total weight of composition solids. The weight average molecular weight of the flow modifying resin generally varies in the range of from 20,000 to 100,000, preferably in the range of from 25,000 to 80,000 and more preferably in the range from 30,000 to 50,000.

The non-aqueous dispersion-type resin is prepared by dispersion-polymerizing at least one vinyl monomer in the presence of a polymer dispersion stabilizer and an organic solvent. The polymer dispersion stabilizer may be any of the known stabilizers used commonly in the field of non-aqueous dispersions, and may include the following substances (1) through (9) as examples:

(1) A polyester macromer having about 1.0 polymerizable double bond within the molecule as obtainable upon addition of glycidyl acrylate or glycidyl methacrylate to an auto-condensation polyester of a hydroxy-containing fatty acid such as 12-hydroxystearic acid.

(2) A comb-type polymer prepared by copolymerizing the polyester macromer mentioned under (1) with methyl methacrylate and/or other (meth)acrylic ester or a vinyl monomer.

(3) A polymer obtainable by the steps of copolymerizing the polymer described under (2) with a small amount of glycidyl (meth)acrylate and, then, adding (meth)acrylic acid to the glycidyl groups thereof so as to introduce double bonds.

(4) A hydroxy-containing acrylic copolymer prepared by copolymerizing at least 20 percent by weight of (meth) acrylic ester of a monohydric alcohol containing 4 or more carbon atoms.

(5) An acrylic copolymer obtainable by producing at least 0.3 double bond per molecule based on its number average molecular weight, into the copolymer mentioned under (4). A method for introducing double bonds may, for example, comprise copolymerizing the acrylic polymer with a small amount of glycidyl (meth) acrylate and then adding (meth)acrylic acid to the glycidyl group.

(6) An alkylmelamine resin with a high tolerance to mineral spirit.

(7) An alkyd resin with an oil length not less than 15 percent and/or a resin obtainable by introducing polymerizable double bonds into the alkyd resin. A method of introducing double bonds may, for example, comprise addition reaction of glycidyl (meth)acrylate to the carboxyl groups in the alkyd resin.

(8) An oil-free polyester resin with a high tolerance to mineral spirit, an alkyd resin with an oil length less than 15 percent, and/or a resin obtainable by introducing double bonds into said alkyd resin.

(9) A cellulose acetate butyrate into which polymerizable double bonds have been introduced. An exemplary method of introducing double bonds comprises addition reaction of isocyanatoethyl methacrylate to cellulose acetate butyrate.

These dispersion stabilizers can be used alone or in combination.

Among the aforementioned dispersion stabilizers, preferred for the purposes of the invention are those which can be dissolved in comparatively low polar solvents, such as aliphatic hydrocarbons to assure the film performance requirements to some extent. As dispersion stabilizers which can meet such conditions, the acrylic copolymers mentioned under (4) and (5) are desirable in that they not only lend themselves well to adjustment of molecular weight, glass transition temperature, polarity (polymer SP value), hydroxyl value, acid value and other parameters but are excellent in weatherability. More desirable are acrylic copolymers containing an average of about 0.2 to about 1.2 polymerizable double bonds, per molecule, which are graft copolymerized with dispersed particles.

The non-aqueous dispersion-type resin used in accordance with this invention can be easily prepared by dispersion-polymerizing at least one vinyl monomer in the presence of the aforedescribed polymer dispersion stabilizer and an organic solvent, which mainly contains an aliphatic hydrocarbon. The dispersion stabilizer and the vinyl monomer are soluble in the organic solvent. However, the polymer particles formed by the vinyl monomer are not soluble in the solvent.

The monomer component forming the acrylic copolymer suitable as the polymer dispersion stabilizer and the vinyl monomer forming the dispersed particles may be virtually any radical-polymerizable unsaturated monomer. A variety of monomers can be utilized for the purpose. Typical examples of such monomers include the following.

(a) Esters of acrylic acid or methacrylic acid, such as for example, $C_{1-18}$ alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, octyl methacrylate, lauryl methacrylate, and stearyl methacrylate; glycidyl acrylate and glycidyl methacrylate; $C_{2-8}$ alkenyl esters of acrylic or methacrylic acid, such as allyl acrylate, and allyl methacrylate; $C_{2-8}$ hydroxyalkyl esters of acrylic or methacrylic acid, such as hydroxyethyl acrylate, hydroxyethyl methacrylate, hydroxypropyl acrylate, and hydroxypropyl methacrylate; and $C_{3-18}$ alkenyloxyalkyl esters or acrylic or methacrylic acid, such as allyloxyethyl acrylate, and allyloxyethyl methacrylate.

(b) Vinyl aromatic compounds, such as, for example, styrene, alpha-methylstyrene, vinyltoluene, p-chlorostyrene, and vinylpyridine.

(c) α, β-Ethylenically unsaturated acids, such as, for example, acrylic acid, methacrylic acid, itaconic acid and crotonic acid (d) Amides of acrylic or methacrylic acid, such as, for example, acrylamide, methacrylamide, n-butoxymethylacrylamide, N-methylolacrylamide, n-butoxymethylmethacrylaamide, and N-methylolmethacrylamide.

(e) Others: for example, acrylonitrile, methacrylonitrile, methyl isopropenyl ketone, vinyl acetate, VeoVa monomer (product of Shell Chemicals, Co., Ltd.; mixed vinyl esters of a synthetic saturated monocarboxylic acid of highly branched structure containing ten carbon atoms), vinyl propionate, vinyl pivalate, isocyanatoethyl methacrylate, perfluorocyclohexyl (meth)acrylate, p-styrenesulfonamide, N-methyl-p-styrenesulfonamide, anf γ-methacryloyloxypropyl trimethoxy silane.

Among the monomers mentioned above, the following materials can be used with particular advantage for the preparation of the acrylic copolymer used as a dispersion stabilizer:

Mixed monomers based on comparatively long-chain, low-polar monomers, such as n-butyl methacrylate, 2-ethylhexyl methacrylate, dodecyl methacrylate, lauryl methacrylate, and stearyl methacrylate, supplemented as necessary with styrene, methyl (meth)acrylate, ethyl (meth) acrylate, 2-hydroxyethyl (meth)acrylate, propyl (meth) acrylate, and (meth)acrylic acid. The dispersion stabilizer may be one prepared by adding glycidyl (meth)acrylate or isocyanatoethyl methacrylate to a copolymer of the monomers for introduction of polymerizable double bonds.

The acrylic copolymer used as the dispersion stabilizer can be easily prepared using a radical polymerization initiator in accordance with the known solution polymerization process.

The number average molecular weight of the dispersion stabilizer is preferably in the range of about 1,000 to about 50,000 and, for still better results, about 3,000 to about 20,000.

Among the monomers mentioned above, particularly preferred vinyl monomers for the formation of the dispersed polymer particles predominantly contain comparatively high-polarity monomers, such as methyl (meth)acrylate, ethyl (meth)acrylate, n-butyl (meth)acrylate, and acrylonitrile, supplemented as necessary with (meth)-acrylic acid, and 2-hydroxyethyl (meth)acrylate. It is also possible to provide gel particles as cross-linked in molecules by copolymerizing a small amount of polyfunctional monomers, such as divinylbenzene, and ethylene glycol dimethacrylate, by copolymerizing a plurality of monomers having mutually reactive functional groups, such as glycidyl methacrylate and methacrylic acid, or by copolymerizing an auto-reactive monomer, such as N-alkoxymethylated acrylamides, and γ-methacryloyloxypropyl trimethoxy silanes.

In conducting the dispersion polymerization, the ratio of the dispersion stabilizer to the vinyl monomer forming dispersed particles is selected from the range of about 5/95 to about 80/20 by weight, preferably about 10/90 to about 60/40 by weight, and the dispersion polymerization can be conducted in the presence of a radical polymerization initiator by a known procedure.

While the particle size of the resulting non-aqueous dispersion type acrylic resin is generally in the range of about 0.05 μm to about 2 μm, the range of about 0.1 μm to about 0.7 μm is preferable from the stability of shelf life and the gloss, smoothness and weatherability of the film.

In use, the first-pack of the two-pack coating composition containing the polyisocyanate and the second-pack containing the melamine and cyclic carbonate are mixed just prior to use or about 5 to 30 minutes before use to form a pot mix, which has limited pot life of about 10 minutes to about 6 hours. Thereafter, it becomes too viscous to permit application through conventional application systems, such as spraying. A layer of the pot mix is typically applied to a substrate by conventional techniques, such as spraying, electrostatic spraying, roller coating, dipping or brushing. Generally, a clear coat layer having a thickness in the range of from 25 micrometers to 75 micrometers is applied over a metal substrate, such as automotive body, which is often pre-coated with other coating layers, such as an electrocoat, primer and a basecoat. The two pack coating composition may be baked upon application for about 60 to 10 minutes at about 80° C. to 160° C.

When the one-pack coating composition containing the blocked polyisocyanate is used, a layer thereof applied over a substrate using aforedescribed application techniques, is cured at a baking temperature in the range of from 80° C. to 200° C., preferably in the range of 80° C. to 160° C., for about 60 to 10 minutes. It is understood that actual baking temperature would vary depending upon the catalyst and the amount thereof, thickness of the layer being cured and the blocked isocyanate functionalities and the melamine utilized in the coating composition. The use of the foregoing baking step is particularly useful under OEM (Original Equipment Manufacture) conditions.

The clear coating composition of the present invention is suitable for providing clear coatings on variety of substrates, such as metal, wood and concrete substrates. The present composition is especially suitable for providing clear coatings in automotive OEM or refinish applications. These compositions are also suitable as clear coatings in industrial and maintenance coating applications.

Testing Procedures

The following test procedures were used for generating data reported in the examples below:

| Test | Test Method |
|---|---|
| Dry film thickness | ASTM D1400 |
| Appearance Excellent, Good (acceptable minimum), Poor | ASTM D523, VISUAL |
| 20° Gloss A rating of at least 80 (acceptable minimum) | ASTM D523 |
| DOI A rating of at least 80 (acceptable minimum) | ASTM D5767 |
| Tukon Hardness | ASTM D1474 |
| MEK rubs | ASTM D5402 |
| Synthetic Rain Acid Etch Resistance | See below |
| Percent solids 65 percent (acceptable minimum) | ASTM D2369 |

Crockmeter—Dry Mar Resistance

Panels, which have cured clearcoat over black basecoats were coated with a thin layer of Bon Ami abrasive supplied by Faultless Starch/Bon Ami Corporation, Kansas City, Mo. The clear coats had a dry coating thickness of 50 microns. The panels were then tested for mar damage for 10 double rubs against a green felt wrapped fingertip of A.A.T.C.C. Crockmeter (Model CM-1, Atlas Electric Devices Corporation, Chicago, Ill.). The dry mar resistance was recorded as percentage of gloss retention by measuring the 20° gloss of the marred areas versus non-marred areas of the coated panels.

Crockmeter—Wet Mar Resistance

Similar Procedure to that used in Crockmeter—Dry Mar Resistance above was used to test wet mar resistance, except the abrasive medium used was a wet alumina slurry instead of Bon Ami abrasive. The composition of the wet alumina slurry was as follows:

| Deionized Water (DI) Water | 294 g |
|---|---|
| ASE-60 ® Thickener[1] | 21 g |
| AMP-95% (10% solution in DI water)[2] | 25 g |
| Aluminum oxide (120# grit)[3] | 7 g |

[1]Associate thickener supplied by Rohm and Haas Company, Philadelphia, Pennsylvania
[2]Supplied by Aldrich Chemicals, Milwaukee, Wisconsin.
[3]Abrasive Supplied by MDC Industries, Philadelphia, Pennsylvania The pH of the slurry was maintained in the range of 7.6–8.0, and the viscosity was maintained at 125±10 poise (Brookfield #4 spindle at 10 rpm). To test the wet mar resistance, 0.7 ml of the slurry was applied over the black basecoated panels having cured clearcoats thereon. The clear coats had a dry coating thickness of 40 microns. The portions of panels coated with the slurry were then tested for mar damage for 10 double rubs against a green felt wrapped finger tip of A.A.T.C.C. Crockmeter (Model CM-1, Atlas Electric Devices). The wet mar resistance was recorded as percentage of gloss retention by measuring the 20° gloss of the marred areas versus non-marred areas of the coated panels.

Synthetic Rain Acid Etch Test

A synthetic rain formulation have the following formulation was prepared:

| Cationic Solution | |
|---|---|
| 28% Aqueous ammonia | 35.7 g |
| 95% Calcium hydroxide | 10.5 g |
| 95% Sodium hydroxide | 12.6 g |
| 85% Potassium hydroxide | 1.2 g |

To the forgoing, deionized water was added to produce 1000 g of cationic solution.

| Anionic Solution | |
|---|---|
| 98% Sulfuric acid | 102.0 g |
| 70% Nitric acid | 42.9 g |
| 35% Hydrochloric acid | 200 g |

To the forgoing, deionized water was added to produce 1000 g of anionic solution.

The synthetic rain was created by adding the anionic solution to the cationic solution until a pH of 1 was achieved. After a 24-hour mixing period, the pH was readjusted to 1.

The test consisted of placing about 0.2 ml drops of the synthetic rain on a test coated surface previously coated with a black basecoat [a 5.08 cm×5.08 cm (2 in.×2 in.) steel panel]. The panel was then placed in a gradient oven at 80° C. for 30 minutes. The etch depth on the test coating, averaged over 12 data points, was measured by a portable profilometer (Surtronic 3P profilometer supplied by Taylor Hobson Inc., Railing Meadows, Ill.).

The invention is illustrated in the following Examples:

EXAMPLES

Example 1

The components listed in Table 1 below were charged to a five-liter flask fitted with a trap, mixer and a condenser. The flask was swept with nitrogen and maintained under a nitrogen blanket during the reaction. The charge was heated to 140° C. to begin to distill off the distillate, which was mostly ethanol created during the reaction. The charge was held for four hours at 140° C. and the distillate was recovered. The temperature of the charge was gradually increased to 160° C. to finish off and recover 748.8 g of the distillate. During cooling phase 81 g of methyl amyl ketone (MAK) solvent was added to yield a clear liquid containing 95% of cyclic carbonate.

TABLE 1

| Trimethylolpropane | 363.43 g |
|---|---|
| Neopentyl glycol | 452.9 g |
| 1,6hexanediol | 512.14 g |
| Diethyl carbonate | 960.0 g |
| Dibutyl Tin dilaurate | 1.8 g |
| Distillate (ethanol) removed | (748.8) |

Example 2

The components listed in Step 1 in Table 2 below were charged to a twelve-liter flask fitted with a trap, mixer and a condenser. The flask was swept with nitrogen and maintained under a nitrogen blanket during the reaction. The charge was heated to 80° C. The components listed in Step 2 in Table 2 below were premixed and were gradually added to the charge over a period of 30 minutes. The temperature of the charge was allowed to increase to 100° C. under exothermic conditions and the charge held at 100° C. for an hour. An Infrared absorbance spectrograph of the charge was taken to ensure that all of the isocyanate added during Step 2 was consumed. Thereafter, the charge was allowed to cool to yield a clear liquid containing 90.17 by volume of cyclic carbonate having a GPC weight average molecular weight of 1884.

TABLE 2

| Step 1 | 3-ethoxy ethyl propionate | 921 g |
|---|---|---|
| Step 1 | Glycerol carbonate[1] | 2478 g |
| Step 1 | Dibutyl Tin dilaurate[2] | 1 g |
| Step 2 | Desmodur ® 3300 diisocyanate[3] | 3880 g |
| Step 2 | Armotic 100 solvent | 200 g |

[1]Supplied by Hunstman Corporation, Austin, Texas
[2]Supplied by Air Products Corporation, Allentown, Pennsylvania
[3]Supplied by Bayer Corporation, Pittsburgh, Pennsylvania The cyclic components of Example 1 and 2 were used to produce coating compositions of the present invention. The material listed below in Table 3 was added to produce the coating compositions of Examples 3, 4, 5 and 6:

TABLE 3

| Material | Use | Example 3 | Example 4 | Example 5 | Example 6 |
|---|---|---|---|---|---|
| Butylene carbonate | reactive diluent | 38.6 g | 19.6 g | 19.6 g | 12.6 g |
| Example 1 | reactive diluent | | 5.6 g | 5.6 g | 5.6 |
| Example 2 | reactive diluent | | 15.6 g | 15.6 g | 17.8 g |
| Cymel ® 350 | Monomeric melamine | | | 19.3 g | |
| Cymel ® 327 | Polymeric melamine | | 21.4 g | | 21.4 g |
| Cymel ® 1158 | Polymeric melamine | 30.36 g | | | |
| Tinuvin ® 292 | Light stabilizer | 1.5 g | 1.5 g | 1.5 g | 1.5 g |
| Tinuvin ® 384 | Light stabilizer | 2.0 g | 2.0 g | 2.0 g | 2.0 g |
| BYK ® 301 | Flow Additive | 0.07 g | 0.07 g | 0.07 g | 0.07 g |
| Dibutyl Tin dilaurate | Catalyst | 0.1 g | | | |
| Phenyl acid phosphate | Catalyst | | 4 g | 4 g | 4 g |
| Desmodur ® 3300 | polyisocyanate | 38.6 g | 38.6 g | 38.6 g | 38.6 g |
| Polyester polyol | Film forming resin | | | | 6.25 g |
| #1 | solvent | 7.7 g | 5.25 g | 5.25 g | 5.25 g |
| #2 | solvent | 2.45 g | | | |
| #3 | solvent | 0.61 g | 0.61 g | 2.45 g | 2.45 g |

Cymel ® 1158,327,350 melamines were supplied by Cytec Industries, West Patterson, New Jersey.
Tinuvin ® 292 & 384 light stabilizers were supplied by Ciba Specialty Chemicals, Tarrytown, New York.
BYK ® 301 flow additive was supplied by BYK Chemie, Wallingford, Connecticut.
Polyester polyol; was the reaction product of 1 mole of Dimethylol propionic acid, 2 moles of caprolactone, 0.41 moles of pentaerythritol having 10,000 GPC weight average molecular weight @, 80% n.v.
Dibutyl Tin Dilaurate was supplied by Air Products Corp. Allentown, Pennsylvania.
Phenyl acid phosphate was supplied by King Industries, Norwalk, Connecticut.

Layers from coating compositions from Examples 3, 4, 5 and 6 were spray applied over electrocoated, and primed phosphated steel which had been previously coated with a forced dried waterborne basecoat and bake cured for 30 minutes at 140° C. to form coatings having a dry film thickness of 40 micrometers thereon. For comparison, a coating from a conventional commercially available 2-pack coating composition (Imron® ES polyurethane) supplied by DuPont Company, Wilmington, Del. was also prepared in the same manner.

The coatings from Examples 3, 4, 5, 6 and Comparative Example 1 (Comp. Ex. 1) were tested for film properties. The results are described in Table 4 below:

TABLE 4

| Coating Properties | Example 3 | Example 4 | Example 5 | Example 6 | Comp. Ex. 1 |
|---|---|---|---|---|---|
| Solids (% non-volatiles) | 85.3 | 87.5 | 87.7 | 85.1 | 53.0 |
| Tukon hardness (Knoops) | 10.1 | 14.3 | 4.1 | 20.9 | 14.3 |
| 20° Gloss | 94 | 94 | 92 | 94 | 89 |
| DOI | 93 | 98 | 95 | 98 | 98 |
| Wet Mar Resistance as % Gloss Retention | 97 | 98 | 99 | 99 | 82 |
| Dry Mar Resistance as % Gloss Retention | 95 | 93 | 92 | 97 | 60 |

TABLE 4-continued

| Coating Properties | Example 3 | Example 4 | Example 5 | Example 6 | Comp. Ex. 1 |
|---|---|---|---|---|---|
| Acid Etch Resistance in Depth in micrometers | 0.87 | 0.5 | 0.2 | 0.25 | 1.57 |

From the foregoing Table 4, it can be seen that the clear coating composition of the present invention not only provides for a clear coating composition at high solids level, but it also provides superior physical properties, such as mar resistance.

Applicants unexpected discovery of the dramatic improvement in the coating properties when the cyclic carbonate component is added to the melamine/isocyanate components composition can be seen from the coating properties of Example 7 and Comparative Example 2 (Comp. Ex. 2) prepared by adding materials listed in Table 5 below:

TABLE 5

| Material | Use | Example 7 | Comp. Ex. 2 |
|---|---|---|---|
| Butylene Carbonate | Reactive Diluent | 11 g | |
| Example 1 | Reactive Diluent | 15 g | |
| Cymel ® 1158 | Polymeric Melamine | 20.56 g | 20.25 g |
| Cymel ® 327 | Polymeric Melamine | 7.8 g | 0.0 |
| Tinuvin ® 292/384 blend | Light Stabilizers | 7.5 g | 7.5 g |
| 10% BYK ® 301 | Flow Additive | 0.68 g | 0.68 g |
| Polyester Resin | Film forming Resin | 9.38 g | |
| 10% Dibutyl Tin dilaurate | Catalyst | | 1 g |
| Acid Solution #1 | Catalyst | 2 g | |
| Acid Solution #2 | Catalyst | | 2.42 g |
| Tolonate ® HDT LV | polyisocyanate | 40 g | 80.8 g |

Butylene Carbonate was supplied by Huntsman Corporation Austin, Texas.
Cymel ® 1158 & Cymel ® 327 were supplied by Cytec Corporation, West Patterson, New Jersey
Tinuvin ® 292/384 solution was supplied by Ciba Chemicals, Tarrytown, New York (Solution of 13.3% Tinuvin ® 292 & 26.67% Tinuvin ® 384 in solvent).
Polyester Resin is condensation product of 1 mole of dimethylolpropionic acid, 2 moles of E-Caprolactone, and 0.27 moles of pentaerythritol.
Tolonate ® HDT LV from Rhodia Co. Freeport Texas
Acid Solution #1 was 25 percent of Phenyl acid phosphate
Acid Solution #2 was 33 percent of 2-amino-2-methyl-n propanolamine blocked dodecylbenzene sulfonic acid supplied by King Industry, Norwalk, Connecticut.

The coatings from Example 7 were tested for film properties. Comparative Example 2 (Comp. Ex. 2) could not be tested as it was too thick to spray. The results are described in Table 6 below:

TABLE 6

| Coating Properties | Example 7 | Comp. Ex. 2 |
|---|---|---|
| Solids (% non-volatiles) | 87.8 | 87.8 |
| Viscosity (#4 Ford Cup) | 70 seconds | 68 seconds |
| 20° Gloss | 94 | (too thick to spray) |
| DOI | 96 | (too thick to spray) |
| Autospec Appearance | 80 | (too thick to spray) |
| Wet Mar Resistance as % Gloss Retention | 95 | (too thick to spray) |
| Dry Mar Resistance as % Gloss Retention | 93 | (too thick to spray) |

From the foregoing results, it can be readily seen that for same solids level (87.8%) addition of the carbonate component has dramatic effect on the film formation, coating appearance and coating properties.

What is claimed is:

1. A clear coating composition comprising isocyanate, cyclic carbonate and melamine components wherein said isocyanate component comprises an aliphatic polyisocyanate having on an average 2 to 6 isocyanate functionalities.

2. The composition of claim 1 wherein said isocyanate functionalities are blocked by reacting said functionalities with a monomeric alcohol.

3. The composition of claim 2 wherein said monomeric alcohol is an aliphatic alcohol.

4. The composition of claim 1 wherein said cyclic carbonate component comprises at least one cyclic carbonate having one or more five or six membered cyclic rings.

5. The composition of claim 1 or 2 wherein said composition further comprises one or more organo tin catalysts or acid catalysts.

6. The composition of claim 5 wherein said organo tin catalyst is selected from the group consisting of dibutyl tin diacetate, dibutyl tin dilaurate, stannous octate, and a combination thereof.

7. The composition of claim 5 wherein the acid catalyst is selected from the group consisting of dodecylbenzene sulfonic acid, dodecylbenzene sulfonic acid blocked with an amine, para-toluenesulfonic acid, para-toluenesulfonic acid blocked with an amine, phenyl acid phosphate, phenyl acid phosphate blocked with an amine, dinonylnaphthalene sulfonic acid, dinonylnaphthalene sulfonic acid blocked with an amine and a combination thereof.

8. The composition of claim 7 wherein said amine is dimethyl oxazolidine, 2-amino-2-methyl-1-propanol, n,n-dimethylethanolamine or a combination thereof.

9. The composition of claim 5 wherein said composition comprises in the range of from 0.001 percent to 5.0 percent of said catalyst, all percentages being weight percentages based on the total weight of composition solids.

10. The composition of claim 1 wherein said polyisocyanate comprises one or more trimers selected from the group consisting of hexamethylene diisocyanate, isophorone diisocyanate, meta-tetramethylxylylene diisocyanate, and a combination thereof.

11. The composition of claim 1, 2 or 6 comprises in the range of from 30 percent to 70 percent said polyisocyanate wherein all percentages are in weight based on the total weight of composition solids.

12. The composition of claim 1, 2 or 10 wherein said polyisocyanate has an average 2.5 to 6 isocyanate functionalities.

13. The composition of claim 1 wherein said melamine component comprises a monomeric melamine, a polymeric melamine, or a combination thereof.

14. The composition of claim 1 or 13 comprises in the range of from 10 percent to 45 percent of said melamine component wherein all percentages are in weight based on the total weight of composition solids.

15. The composition of claim 1 further comprises a flow modifying resin.

16. The composition of claim 1 comprises in the range of from 5 percent to 40 percent of said carbonate component, all percentages being in weight percentages based on the total weight of composition solids.

17. The composition of claim 1 in the form of a two-pack composition wherein a first-pack of said two-pack composition comprises said polyisocyanate component and a second-pack of said two-pack composition comprises said melamine and cyclic carbonate components.

18. The composition of claim 1 wherein a VOC of said composition varies in the range of from 0.0 to 0.472 kilogram of an organic solvent per liter of the composition.

19. The clear coating composition of claim 1 wherein a clear coating on a substrate produced from said composition has a DOI rating of at least 80.

20. The composition of claim 1 further comprises ultra violet light stabilizers, light absorbers or a combination thereof.

21. A method of producing a clear coating on a substrate comprising:

applying a layer of a one-pack clear coating composition comprising isocyanate, cyclic carbonate and melamine components wherein said isocyanate component comprises an aliphatic polyisocyanate having on an average 2 to 6 isocyanate functionalities wherein said isocyanate functionalities of the polyisocyanate are blocked by reacting said polyisocyanate with a monomeric alcohol; and curing said layer into said clear coating at an elevated baking temperature in the range 80° C. to 160° C.

22. The method of claim 21 wherein said coating has a DOI rating of at least 80.

23. The method of claim 21 wherein said coating has a 20° gloss of at least 80.

24. The method of claim 21 wherein said cyclic carbonate component comprises at least one cyclic carbonate having one or more five or six membered cyclic rings.

25. The method of claim 21 wherein said composition comprises in the range of from 5 percent to 40 percent of said carbonate component, all percentages being in weight percentages based on the total weight of composition solids.

26. A method of producing a clear coating on a substrate comprising:

applying a layer of a two-pack clear coating composition consisting essentially of isocyanate, cyclic carbonate and melamine components wherein said isocyanate component comprises an aliphatic polyisocyanate having on an average 2 to 6 isocyanate functionalities; and curing said layer into said clear coating under ambient conditions or at an elevated baking temperature in the range 80° C. to 160° C.

* * * * *